UNITED STATES PATENT OFFICE.

PAUL JULIUS AND FRIEDRICH REUBOLD, OF LUDWIGSHAFEN, GERMANY, ASSIGNORS TO THE BADISCHE ANILIN AND SODA FABRIK, OF SAME PLACE.

BROWN-BLACK SULFUR DYE.

SPECIFICATION forming part of Letters Patent No. 650,326, dated May 22, 1900.

Application filed March 16, 1900. Serial No. 8,950. (No specimens.)

*To all whom it may concern:*

Be it known that we, PAUL JULIUS, doctor of philosophy, a subject of the Emperor of Austria-Hungary, and FRIEDRICH REUBOLD, doctor of philosophy, a subject of the King of Bavaria, both residing at Ludwigshafen-on-the-Rhine, in the Kingdom of Bavaria, Empire of Germany, have invented new and useful Improvements in Brown-Black Coloring-Matter, of which the following is a specification.

Our invention relates to the manufacture of a new brown-black coloring-matter which directly dyes unmordanted cotton. It can be obtained from a certain meta-phenylen-diamin derivative by treating the same with sulfur and sodium sulfid. The said meta-phenylen-diamin derivative results from the condensation in alcoholic solution of one molecular proportion of symmetrical dinitro-dichlor-benzene with one molecular proportion of ortho-amido-phenol-hydrochlorid and one molecular proportion of para-amido-phenol-hydrochlorid in the presence of a body that will bind the hydrochloric acid formed during the reaction, such as sodium acetate. Dinitro-ortho-para-dihydroxy-diphenyl-meta-oxyphenylen-diamin is hereby obtained, which, judging from the manner of its formation, has the constitution represented by the formula

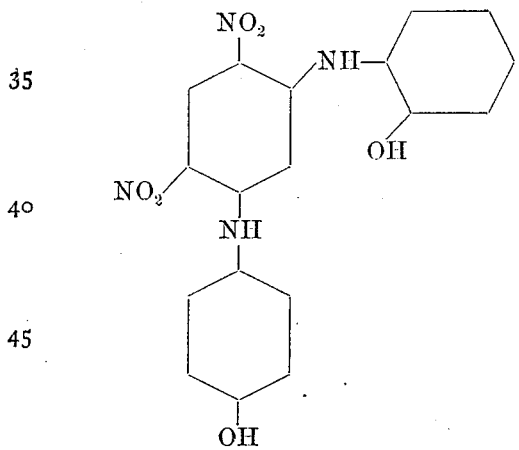

and this when treated with sulfur and sodium sulfid in the manner to be described yields the coloring-matter we desire to claim.

The following example will further serve to illustrate the manner in which our invention may be carried into practical effect and our new coloring-matter obtained. The parts are by weight.

*Production of a new brown-black coloring-matter from dinitro-ortho-para-dihydroxy-diphenyl-meta-phenylen-diamin.*—Prepare the required initial material by boiling in a reflux apparatus an alcoholic solution of one molecular proportion of dinitro-dichlor-benzene and one molecular proportion of ortho-amido-phenol-hydrochlorid with sufficient sodium acetate to bind the hydrochloric acid formed during the reaction. Continue the heating until the dinitro-dichlor-benzene has practically disappeared. The product of the reaction separates out on cooling. Drain this, wash and dry it, then heat it in an autoclave with one molecular proportion of para-amido-phenol-hydrochlorid, sufficient sodium acetate to bind the hydrochloric acid formed during the reaction, and alcohol to 120° centigrade for about two hours. Isolate the reaction product in any well-known way. Mix together fifteen (15) parts of the dinitro-ortho-para-dihydroxy-diphenyl-meta-phenylen-di-amin thus obtained with seventy-five (75) parts of crystallized sodium sulfid and twenty-five (25) parts of sulfur. Heat the mixture gradually while stirring to a temperature of about 140° to 160° centigrade and maintain the melt at this temperature until dry. When powdered, it can be used directly for dyeing, or the dyestuff can be precipitated from its aqueous solution by common salt, in which case when dyeing sodium sulfid must be added to the dyeing-bath.

Our new dyestuff is readily soluble in water with a dark violet color and dyes unmordanted cotton brown-black shades, which on treatment with potassium bichromate, as also with sodium peroxid, become slightly browner. The addition of hydrochloric acid to its aqueous solution produces a dirty violet precipitate.

Now what we claim is—

The new coloring-matter that can be obtained from dinitro-ortho-para-dihydroxydiphenyl-meta-phenylen-diamin, sulfur and sodium sulfid, which dissolves in water with a dark violet color dyeing unmordanted cotton brown-black shades which on treatment with bichromate and also with sodium peroxid becomes somewhat browner and whose aqueous solution on addition of hydrochloric acid gives a dirty violet precipitate substantially as described.

In testimony whereof we have hereunto set our hands in the presence of two subscribing witnesses.

PAUL JULIUS.
FRIEDRICH REUBOLD.

Witnesses:
ERNEST F. EHRHARDT,
JOHN L. HEINKE.